US009123208B2

(12) United States Patent
Davis et al.

(10) Patent No.: US 9,123,208 B2
(45) Date of Patent: Sep. 1, 2015

(54) METHOD AND APPARATUS FOR SETTLEMENT OF PROCESSOR BASED TOURNAMENT COMPETITION

(71) Applicant: Malcolm B. Davis, Dallas, TX (US)

(72) Inventors: Malcolm B. Davis, Dallas, TX (US); Fredrik A. Dahl, Loerenskog (NO)

(73) Assignee: Malcolm B. Davis, Dallas, TX (US)

( * ) Notice: Subject to any disclaimer, the term of this patent is extended or adjusted under 35 U.S.C. 154(b) by 154 days.

(21) Appl. No.: 13/839,034

(22) Filed: Mar. 15, 2013

(65) Prior Publication Data

US 2013/0267291 A1 Oct. 10, 2013

Related U.S. Application Data

(63) Continuation-in-part of application No. 13/050,221, filed on Mar. 17, 2011, now Pat. No. 8,579,700.

(60) Provisional application No. 61/315,574, filed on Mar. 19, 2010.

(51) Int. Cl.
*G06F 17/00* (2006.01)
*G07F 17/32* (2006.01)

(52) U.S. Cl.
CPC ........ *G07F 17/3293* (2013.01); *G07F 17/3244* (2013.01); *G07F 17/3276* (2013.01)

(58) Field of Classification Search
USPC ........................................................ 463/16–25
See application file for complete search history.

(56) References Cited

U.S. PATENT DOCUMENTS

2012/0244933 A1* 9/2012 Acres ................................ 463/27
2014/0113711 A1* 4/2014 Acres ................................ 463/26
2014/0274316 A1* 9/2014 Elias et al. ........................ 463/25

* cited by examiner

*Primary Examiner* — Ronald Laneau
(74) *Attorney, Agent, or Firm* — Howison & Arnott LLP

(57) ABSTRACT

A method of providing or receiving value from or to a participant value in a game tournament wherein a plurality of participants play a casino-style game, includes calculating an expected value for the position of each participant in the tournament, the expected value based upon the number of wagering units held by the participant at the point in time, the number of wagering units held by each other participant in the tournament at the point in time and a payout table for the tournament.

20 Claims, 4 Drawing Sheets

| PLACE | PAYOUT (% OF POT) |
|---|---|
| 1st | 33% |
| 2nd | 20% |
| 3rd | 15% |
| 4th | 11% |
| 5th | 8% |
| 6th | 7% |
| 7th | 6% |

| PLACE | PAYOUT (% OF POT) |
|---|---|
| 1st | 33% |
| 2nd | 20% |
| 3rd | 15% |
| 4th | 11% |
| 5th | 8% |
| 6th | 7% |
| 7th | 6% |

| PLACE | PAYOUT PERCENTAGE % | PROBABILITY OF FINISHING IN PLACE (P) | PRIZE POT (PP) | PAYOUT % * P * PP = EV |
|---|---|---|---|---|
| 1st | 33% | 10% | $100,000 | $3300 |
| 2nd | 20% | 11% | $100,000 | $2200 |
| 3rd | 15% | 12% | $100,000 | $1800 |
| 4th | 11% | 12% | $100,000 | $1320 |
| 5th | 8% | 13% | $100,000 | $1040 |
| 6th | 7% | 15% | $100,000 | $1050 |
| 7th | 6% | 17% | $100,000 | $1020 |
| | | | | $11,730 |

FIG. 5

| PLAYER NO. | WAGERING UNITS (CHIP STACK) | PERCENT OF TOTAL UNITS | EXPECTED VALUE | PERCENT OF PRIZE POT | CHIP INDEX |
|---|---|---|---|---|---|
| 1 | 65,975 | 30.04 | 5514.6 | 19.0 | 0.63 |
| 2 | 46,250 | 21.06 | 4664.30 | 16.1 | 0.76 |
| 3 | 23,525 | 10.70 | 3380.51 | 11.6 | 1.09 |
| 4 | 19,050 | 8.67 | 3026.80 | 10.4 | 1.20 |
| 5 | 16,700 | 7.60 | 2842.68 | 9.8 | 1.29 |
| 6 | 16,400 | 7.47 | 2800.00 | 9.6 | 1.29 |
| 7 | 14,450 | 6.68 | 2638.22 | 9.1 | 1.38 |
| 8 | 9,650 | 4.39 | 2192.50 | 7.6 | 1.72 |
| 9 | 7,625 | 3.47 | 1971.37 | 6.8 | 1.96 |

TOTAL PAYOUT - $29,032.00
TOTAL WAGERING UNITS - 219,625

| PAYOUT TABLE | |
|---|---|
| 1 | 8944 |
| 2 | 5545 |
| 3 | 4130 |
| 4 | 3092 |
| 5 | 2333 |
| 6 | 1773 |
| 7 | 1357 |
| 8 | 1046 |
| 9 | 811 |

METHOD AND APPARATUS FOR SETTLEMENT OF PROCESSOR BASED TOURNAMENT COMPETITION

CROSS-REFERENCE TO RELATED APPLICATIONS

This application is a continuation-in-part of U.S. patent application Ser. No. 13/050,221, filed Mar. 17, 2011, entitled METHOD AND APPARATUS FOR SETTLEMENT OF PROCESSOR BASED TOURNAMENT COMPETITION which claims benefit of U.S. Provisional Application No. 61/315,574, filed Mar. 19, 2010, entitled METHOD AND APPARATUS FOR SETTLEMENT OF PROCESSOR BASED TOURNAMENT COMPETITION, the specifications of which are incorporated herein by reference.

TECHNICAL FIELD

The following disclosure relates to tournament poker and in particular to a system and method for enabling a participant to "cash-in" his or her position for a fair value prior to the end of a tournament and for a participant to buy into a tournament for a fair value.

BACKGROUND

Tournament poker, played for example over the internet, has become quite popular in recent years. Such tournaments may continue for exorbitantly long hours before completion and the determination of final winners. Consequently, some players may, for one reason or another, wish to leave the tournament before the tournament is completed. However, in many cases, a player that withdraws from a tournament before the tournament is over loses any value associated with his or her chip position.

The ability to cash-out for a small discount to the expected value of a participant's chip position at any time in a tournament may have significant appeal to players that may have to leave the tournament for one reason or another or participants that simply wish to stop playing and receive a fair value for their chip position. For example, a player may enter a tournament with a "buy in" of for example, one thousand dollars and begin the tournament with a corresponding chip count or position, e.g., one thousand dollars in chips. Assuming that the player is successful, as the tournament progresses and other players are eliminated, the player's chip position may increase to, for example, three thousand dollars. At this point, the player may wish to withdraw from the tournament and receive the fair value of his chip position, less a discount or penalty for withdrawing from the tournament.

SUMMARY

In one embodiment, a method of providing a participant value in a game tournament wherein a plurality of participants play a casino-style game such as poker, includes providing value to the participant based upon a calculated expected value of the participant's position at the time the participant elects to withdraw from the tournament. The expected value of the position of each participant in the tournament is calculated, the expected value based upon the number of wagering units held by the participant at the point in time, the number of wagering units held by each other participant in the tournament at the point in time and a payout table for the tournament. Based upon the expected value, a tournament participant withdrawing from the tournament is provided with value proportional to the calculated expected value of the participant's position at the point in time the participant elects to withdraw.

In one aspect, the method further includes calculating a probability for each participant that the participant will complete the tournament in a given place relative to the other participants in the tournament. In this regard, a machine based tournament simulation may be used to calculate the probabilities for each participant completing the tournament in a place relative to other participants. The machine-based simulation may be a Monte Carlo simulation wherein multiple simulated games are played to eliminate players.

In another aspect, the game tournament is conducted via a network wherein the participants are linked to a central processing unit including a game engine that generates game results for the participants. The central processing unit may transmit a signal to the participants indicating the expected value of each participant's position in the tournament. The expected value of the participant's position may be displayed continuously or on demand to the participant. In one variation, real-time participant information including the expected value for each participant's position and the number of wagering units of each of the participants of in the tournament at the point in time may be displayed to a viewing audience.

In another embodiment, a method of receiving value from a prospective participant entering into a game tournament wherein a plurality of participants play a casino-style game is presented. The entry of the prospective participant is contingent upon the participant paying a buy-in fee which is based upon a calculated expected value of the participant's position at the time the participant elects to join the tournament. An expected value for the position of each participant in the tournament is calculated, including the prospective participant with the expected value based upon the number of wagering units held by participants at the time, a buy-in fee for the prospective participant and a payout table for the tournament. A fee or value is received from the prospective participant, the value proportional to the calculated expected value of the participant's position at the time.

In another aspect, a method of providing a game participant in a casino-style game tournament valued based upon an expected value of his position in the tournament includes the step of calculating an expected value of a tournament participant's position and displaying the expected value to the tournament participant. If withdrawal from the tournament involves a penalty, the method may further include calculating a penalty for withdrawal prior to the end of the tournament, reducing the expected value of the tournament participant's position by the amount of the penalty to determine an adjusted value of the tournament participant's position and displaying the adjusted value to the tournament participant. In one variation, both the expected value of the tournament participant's position and the adjusted value of the tournament participant's position may be displayed to the tournament participant.

In another variation, a method provides a participant value in a game tournament wherein a plurality of participants play a casino-style game using player terminals linked via an electronic network to a central processing unit. The value provided to the participant is based upon the participant's equity at the time the participant's equity reaches at least one preselected cash out value provided by the participant. The method includes receiving, at least one equity cash out value and storing, with the central processing unit the cash out value which is input by the participant using the player terminal. An equity value for the participant in the tournament is determined with the central processing unit based upon the number of wagering units held by the participant at the point in time, the number of wagering units held by each other participant in the tournament at the point in time and a payout table for the tournament.

The participant's equity is compared to the stored cash out value and if the tournament participant's equity has reached or exceeded the cash out value, the participant is automatically withdrawn from the tournament and participant is provided with value proportional to the participant's equity. Alternatively, if the cash out value is not reached or exceeded, tournament play is continued. In one aspect, upper and lower cash out values are by the tournament participant using a user terminal. If the tournament participant's equity drops to a value equal to or less than the lower cash out value or a value equal to or greater than the upper cash out value, the participant is automatically withdrawn from the tournament and provided with value proportional to the participant's equity.

In one embodiment, the participant is notified when his or her equity drops to a value equal to or less than the lower cash out value or a value equal to or greater than the upper cash out value and the participant may then choose to withdraw from the tournament or continue play.

In one aspect, the casino-style game is poker and the step of estimating an equity for each participant includes simulating multiple games with the central processing unit wherein a series of games are played to completion with participants being eliminated. In another aspect, the game tournament may be conducted via a network wherein the tournament participants are electronically linked to a central processing unit via the player terminals and wherein the central processing unit includes game engine that generates game results for the participants.

BRIEF DESCRIPTION OF THE DRAWINGS

For a more complete understanding, reference is now made to the following description taken in conjunction with the accompanying Drawings in which:

FIG. 5 is a table illustrating a hypothetical implementation of a method according to the disclosure.

DETAILED DESCRIPTION

Figures 1, 2:
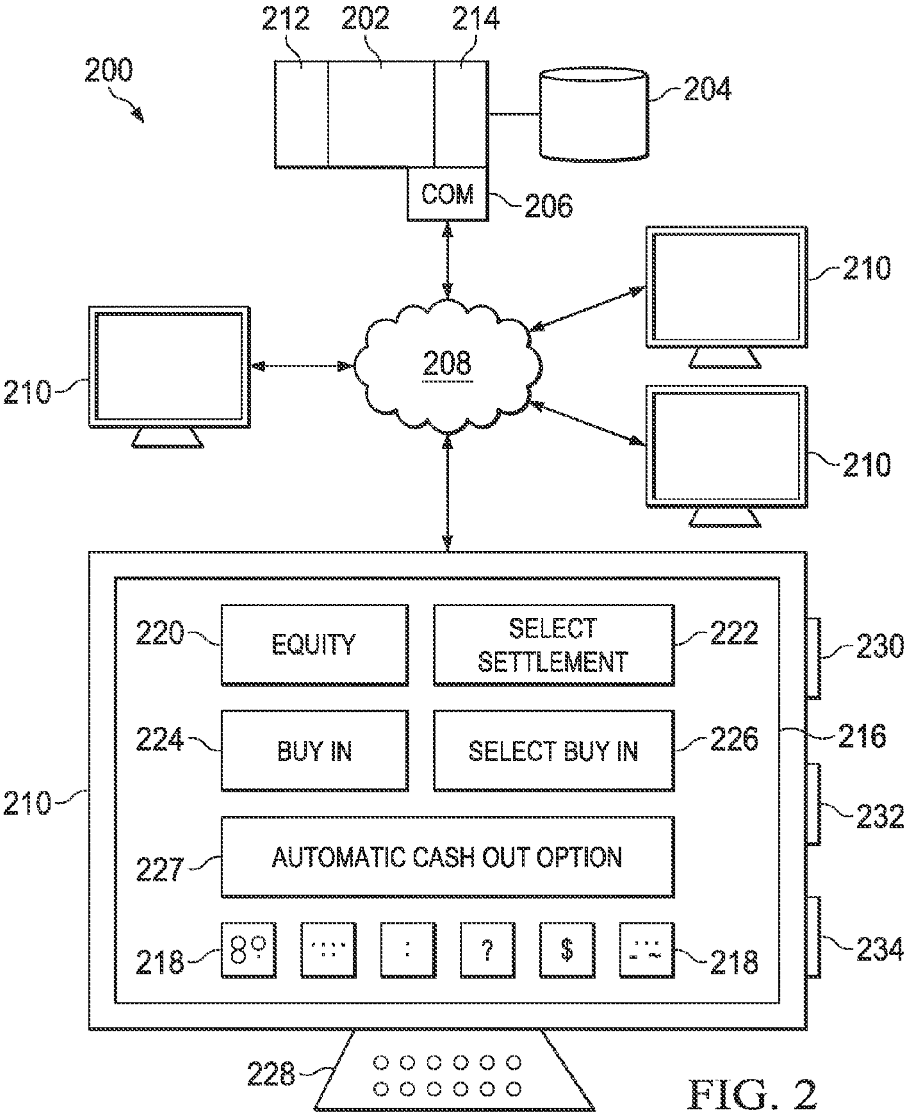
FIG. 1 illustrates an exemplary tournament pay table.
FIG. 2 is a diagrammatic representation of one system for implementing a method according to the disclosure.

Referring now to the drawings, wherein like reference numbers are used herein to designate like elements throughout, the various views and embodiments of a method and apparatus for settlement of processor based tournament competition are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

As used herein, the tournament generally refers to casino-style games wherein a plural of participants play against each other or possibly against a machine-implemented game machine. Although the method is described in connection with poker, and in particular, with "Hold'em poker" it will be appreciated that the method may be utilized in connection with other casino-style games that may be utilized in tournaments such as other electronic, machine-implemented card games, slot machine games, and similar games typically presented to users in a casino or similar establishment.

In one embodiment, a settlement "equity" button or option is displayed at the completion of each hand during the tournament. When the settlement "equity" button is selected by the player, the expected value of the player's position is estimated and displayed before the next hand is dealt. The expected value of the player's position is estimated based upon his or her chip count (wagering units), the number of players remaining, the distribution of chips between the remaining players, and the tournament pay table. If a participant does not activate a corresponding "settlement" button or switch within a few seconds, the next hand is dealt and the option is concurrently withdrawn. If the "settlement" button is selected by the player, the player is withdrawn from the tournament and paid the expected value of his or her chip position less a discount or penalty.

The penalty for settling may vary as the tournament progresses. For example, in the early rounds of a tournament, a 10% penalty may be assessed for settling; whereas in the final several rounds, the penalty may be reduced to 5%. In one variation, the poker website may retain an administration fee, for example 20% of the penalty and place 80% of the penalty back into the prize pool. Thus, any potential objections by the remaining players will be ameliorated by the addition to the remaining players' prize pool.

A poker website implementing the method described herein may benefit on three fronts: attracting players away from other websites, inducing players to enter when time constraints make participation otherwise prohibitive, and retention of the administrative fee. Many players will appreciate the settlement feature, as they will be able to monitor their financial progress. The feature also satisfies the inherent proclivity of humans for hedge strategies.

One objective of the method is to provide a unique, fair, accurate and equitable method for informing competitors on an ongoing basis of their current, or near current financial standing in competitive tournaments in general. The purpose may be for general interest, or it may be to determine an actual "cash-out" settlement value. The method employs a pay table for prize distribution, or a similar method for determining the amounts of all the prizes which will be awarded at the end of the tournament. the calculated expected value for the position of each participant in the tournament is based upon one or more tournament pay out schedules or pay tables, including, but not limited to a winner take all payout. In other variations, tournament rules may specify a winner-take-all finish, in which case the method may be adapted insofar as the pay table will be simplified to a single entry for the prize distribution.

One application of the method may be to inform a viewing audience what each player's equity is at any given time, and from time to time, what equity swings will result from the player's decision to call or fold. Still another application might be to furnish the "World Series of Poker," or other competitions, the amounts of the remaining player's equities, e.g., the expected value of the player's chip position at the end of each daily session or at selected intervals during play, for example, at the end of each hand. This information could be provided solely as a matter of interest or it may be used as a basis for settlements in actual tournaments.

As will be appreciated, the number of calculations required to generate an estimate of the expected value of a participant's hand in real time necessitates that the estimates be calculated with a computer processor. In one embodiment, a high-speed computer is utilized, running Monte Carlo or modified Monte Carlo simulation(s) to estimate, in real-time, the current status, e.g., expected value of each player's position. The machine-based simulation plays out the tournament repeatedly in random fashion with sufficient iterations to achieve satisfactory confidence in the results. The variables of prize distribution, number of participants remaining, and their current respective game stakes produce consistent estimates, allowing for statistical variance.

While the method described herein may be employed in a variety of competitive environments, the method is particularly suitable for use in connection with internet gaming, and specifically, internet poker tournaments. One or more high-speed computer processors accessible via the internet are utilized to calculate or closely estimate each participant's monetary expectation at the end of each hand and before the beginning of the next hand. A player may participate in a tournament using a personal computer, a smart phone or similar communications device that allows the player to access a website and enter a tournament. Each participant's monetary expectation, e.g. equity, may be automatically displayed on each player's computer monitor, or may be made available at the player's request.

The method described herein provides players on a real-time, ongoing basis a "fair-settlement-value" for their chip position which they may elect to cash-out at any time, or alternatively, at times restricted by pre-stated tournament rules. It is anticipated that a penalty or discount to the expected value of the participant's chip position will be involved, at the pre-stated discretion of the tournament rules committee. The settlement option will be available before the beginning of each new deal, and will be the player's unilateral decision subject to tournament rules.

Input parameters to conduct the Monte Carlo simulation or a modified Monte Carlo simulation, include tournament prize pay table(s), the number of remaining players in the tournament, and their respective positions, e.g., amounts potentially at risk, and/or their "stack sizes", e.g., chip positions. As used herein, a participant's "position," or "chip stack" refers to the number of chips or wagering units in the possession of the participant. It will be understood that chips or wagering units are a means of determining a participant's position with respect to other participants in the tournament and have no set value. It will also be appreciated that the expected value associated with a chip or wagering unit may vary between participants at any given point in time. Further, while in one embodiment, the method initially assumes that all players are equal in skill, at some time this parameter may be altered to reflect possible advantages of more skilful players as the tournament progresses. It is conceivable that in some instances, different simulations will be made with varying assumptions.

FIG. 1 shows an exemplary seven place pay table that may be used in a tournament. Utilizing the pay table of FIG. 1, the first place finisher would receive 33% of the prize pot while the seventh place finisher would receive 6% of the prize pot. Typically the prize pot consists of the entry or "buy-in" fees paid by the participants to enter the tournament, less a percentage paid to the tournament operator. Numerous different pay tables may be utilized in tournament poker (or similar casino-style games) depending upon the particular game, the level of players, the number of players and other factors. In order to determine the probability of a player finishing in a paying position, a Monte Carlo simulation, or a calculation which reaches equivalent results, is employed, taking into consideration the number of participants remaining in the tournament at any given time and the chip distribution among the participants. Although not a necessary condition, one embodiment would involve the assumption that all players are equal in their levels of competence. In other variations a success factor could be used to weight a player's level of skill.

FIG. 2 is a schematic representation of a system suitable for use in implementing an online or networked system for enabling players to participate in a machine based poker tournament including an equity cash-out or buy-in for players during the tournament. The system includes one or more computer processors 202 with one or more associated data storage devices 204 for storing game software, statistics, tournament participant records including account balances, participant tournament positions etc. A wired or wireless communications interface 206 enables communications between a plurality of player terminals 210 and processor 202 via a public or private network. Player terminals 210 may be dedicated gaming machines located in casinos or similar establishments or may be personal computers located in residences or other locations convenient to potential players. A game machine 214 includes hardware, firmware and software necessary to conduct the tournament. An estimate engine 212 includes hardware, firmware and software necessary to conduct simulations and estimate the probability of the participants finishing in different places (e.g., $1^{st}$, $2^{nd}$, $3^{rd}$, . . . ) in the tournament.

Player terminals 210 may include a display 216 used to display indicia representing a game state, for example, in the case of poker, the display may include visual representations of cards 218 dealt. In one embodiment display 216 is a touch screen graphical user interface that provides a participant with different options as described in greater detail below. For example, the display may include an "equity" button 220 enabling a participant to have an estimated expected value of his tournament position displayed. In different variations, the participant's expected value or "equity" may be displayed continuously on display 216. In other variations player terminal 210 may be provided with an audio speaker or similar output device so that a participant may be informed of his or her "equity" by means of an audio message. Player terminal 210 may be provided with an audio output jack or wireless transmitter enabling a participant to receive a message with his or her "equity" with a wired or wireless headset or earphone.

Player terminals 210 may also include a "select settlement" button 222 enabling the potential participant to settle for the expected value of his position, less any fee or discount applied by the tournament operator. The "select settlement" button may be part of a touchscreen display 216 or a conventional button, lever or switch accessible to the tournament participant. In either case, the participant is informed of his or her "equity" and afforded a timely opportunity to settle or "cash out," for example, before the next game is initiated on player terminal 210. In the case of a poker or similar card game, the participant may be informed of his or her "equity" and provided an opportunity to cash out before the next hand is dealt.

In different embodiments, a participant may be provided with the opportunity to set an automatic "cash out" value such that when the participant's equity reaches the participant's pre-set value, the participant is automatically cashed out of the tournament. For example, a participant may buy into a tournament with $5000.00 and decide that he or she will cash out if his or her equity reaches $10,000.00. In one embodiment, the participant may be provided with the option of pre-setting a $10,000.00 limit. If the participant is successful in accumulating $10,000.00 dollars in equity, he or she will automatically be cashed out of the tournament. In this embodiment, display 216 terminals 210 (FIG. 2) may include an "automatic cash out" button that prompts a participants to enter an equity value at which he or she will be "cashed out" of the tournament. Alternatively, a participant may elect to be automatically cashed out if his or her equity drops to a pre-selected level. For example, a participant buying into a tournament with $5000.00 may decide that he or she will cash out if his or her equity falls to, for example, $3000.00. In different variations, a participant may elect to choose an automatic cash out after the tournament has begun.

The display may also include a "buy-in" button 224 that enables a prospective participant to have a "buy-in" fee or position displayed and a "select buy in" button 226 enabling the prospective player to buy into the tournament. If terminal 210 is not equipped with a graphical user interface, the terminal may be provided with other devices, such as a keyboard 228, switches, levers and the like to enable a participant or prospective participant to use the terminal. If terminals 210 are dedicated electronic gaming machines located in casinos or similar establishments, the terminals may include means for receiving and dispensing value such as a card reader 230, a currency reader/dispenser 232 or a ticket or token receiver/dispenser 234. Alternatively, if terminals 210 are personal computers located in residences or other locations convenient to potential players, the participants may be required to maintain an account with, or accessible to the tournament operator, that may be debited and credited to receive and dispense value.

Figure 3A:
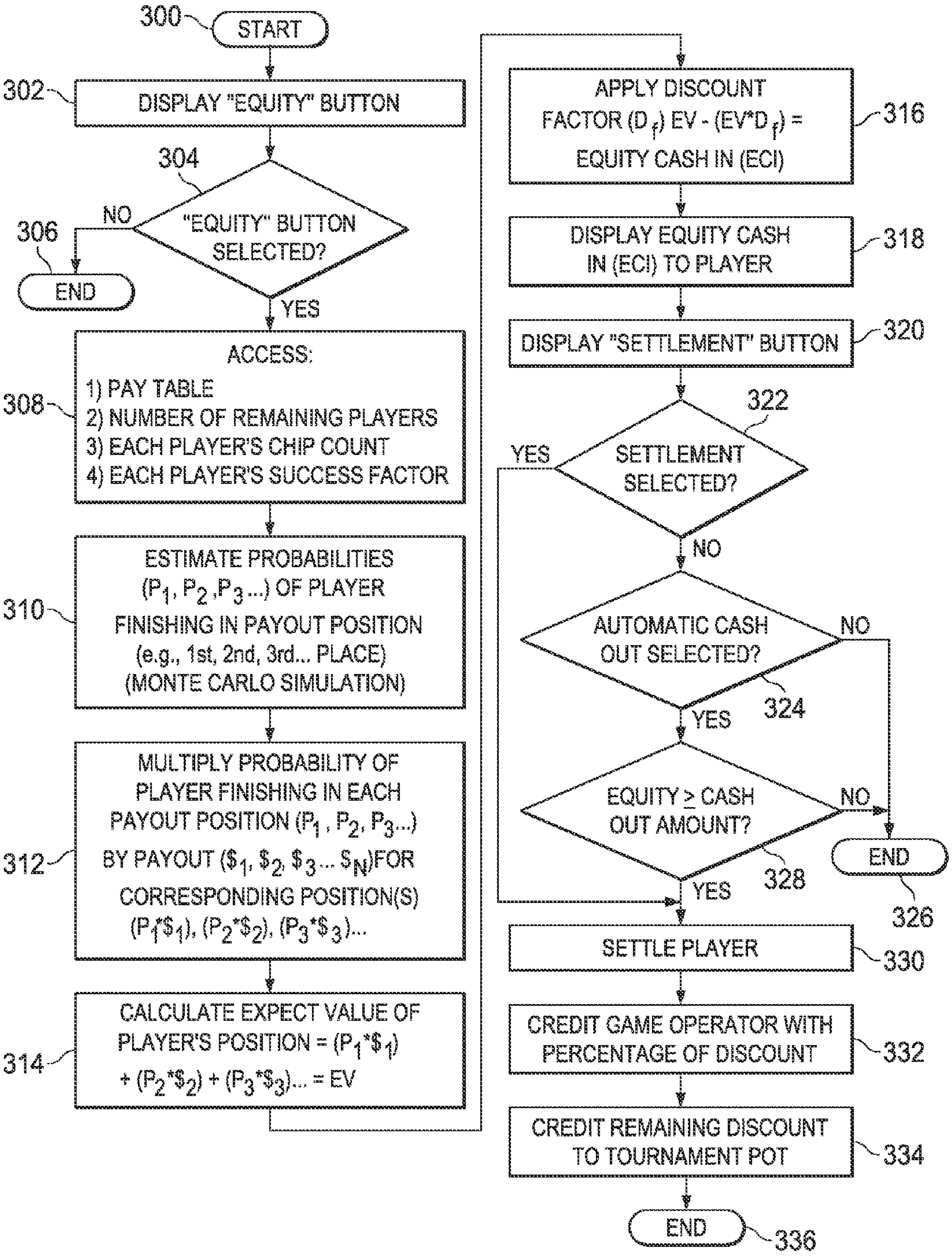
FIG. 3A is a flowchart illustrating one method according to the disclosure.

FIG. 3A is a flowchart illustrating one method of providing an equity cash-out option during an online poker tournament or in a tournament being played on a plurality of networked video game machines. The process starts at 300 with the conclusion of a poker hand during the tournament. At step 302, the participants in the tournament are presented with a display on terminals 210 (FIG. 2) giving the players the option of pressing an "equity" button. If a participant elects not to press the "equity" button at step 304, within a predetermined time period, for example, 10 or 15 seconds, the process ends with respect to that participant and the tournament will continue after the remaining participants either decline or elect to proceed as hereinafter described.

Assuming that a participant elects to push the "equity" button at step 304, processor 202 accesses or collects the following information at step 308: 1) the pay table for the tournament, 2) the number of players remaining in the tournament; 3) each player's chip count, and optionally, 4) "success factors," (e.g., a number indicative of the player's skill) for participants. The optional success factor may be based on a player's performance in the particular tournament, for example the number of and/or size of the hands the player has won in the tournament. Alternatively, the optional success factor may be based the player's performance e.g. finishing position(s), the amount the player has won or lost in previous tournaments and similar factors. As will be appreciated, the number of players remaining in the tournament, and each player's chip count will change from hand-to-hand during the tournament as may the optional player success factor.

At step 310, processor or processors 202 utilize an estimation engine 212 to estimate, for each player, that has elected the "equity" option, the probabilities ($P_1$, $P_2$, $P_3$, . . . ) that the player will place in one of the paying positions ($1^{st}$, $2^{nd}$, $3^{rd}$, . . . ). In other embodiments, the probabilities may be computed for each player so that the expected value ("equity") of each player's position may be determined and displayed to the player at the conclusion of each hand. The estimation engine 212 includes the software, firmware and hardware necessary to conduct the calculations in a timely fashion.

In one embodiment, the estimation engine 212 uses a Monte Carlo or modified Monte Carlo simulation to play the tournament to completion a sufficient number of times to provide an estimate to a predetermined desired level of confidence. For example, the estimates may be based upon a sequence of simulated "all-in" events between randomly drawn players. During the simulation, each player is dealt a poker hand at random and the player with the smaller chip stack wagers his entire stack on the outcome of the hand. If the player with the larger cash or chip position wins, the loser's chip stack is added to the winner's, and the loser exits the tournament with a position determined by the number of remaining players.

If the player with the lesser chip position stack side wins the hand, his stack is doubled at the expense of his opponent, as in a regular poker tournament. The tournament simulation continues until all but one of the players or participants is eliminated and estimates of the probabilities of final places of the players in question have been determined. As previously noted, the inputs to run the simulation include the pay table for the tournament, the number of players remaining in the tournament, and each player's chip count. Optionally, a player's "success factor," e.g., a number indicative of the player's skill level or previous success may be employed in the simulation. If a "player success factor" is considered, it may be used to weigh (increase or decrease) the estimated probability of a player finishing in a paying position.

In order to estimate the "equity" of a given player (the expected value of the player's position), a string of simulations is used to provide an estimated placement distribution P1, P2, . . . Pn, where Pi is the probability of the player finishing in place i. The tournament simulation is repeated a sufficient number of times and the results averaged to obtain an estimated placement distribution with the desired level of confidence. For example, the tournament simulation may be repeated 50, 100, 1000 or a greater number of times.

For those players electing the "equity" option, for each such player, the probability (P1, P2, P3, . . . Pn) of that player finishing in one of the paying positions n is multiplied by the payout ($1, $2, $3, . . . $n) of that position to calculate the player's "equity" or expected value of the player's position as P1*$1+P2*$2+ . . . +Pn*$n. For the purpose of illustration, a "Hold'em" poker tournament may have seven remaining players with the tournament rules providing for payouts to the top seven finishing positions in the tournament with an exemplary payout table as illustrated in FIG. 1. Referring to the payout table, for example, if the total prize pot is $100,000, the payout ratio from FIG. 1 for first place is 33%. If the estimated probability of a player finishing in first place is 10%, the result is $100,000*0.33*0.10=$3300.00. This calculation is repeated for each paying position and the results are summed for that player at step 314 to determine an expected value (EV) for the player's position: $EV=((P_1*\$_1)+(P_2*\$_2)+(P_3*\$_3))$.

Figures 3B, 4:
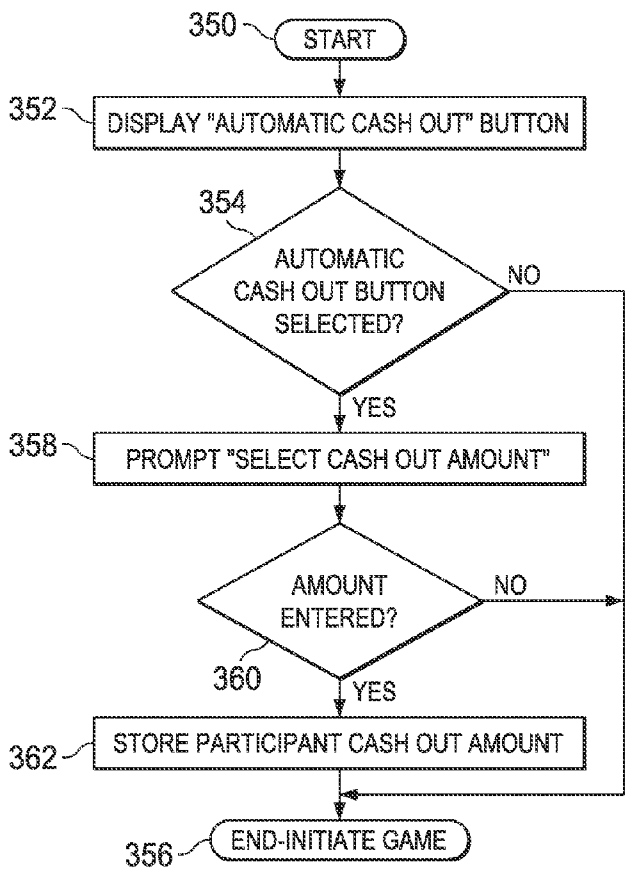
FIG. 3B is a flowchart illustrating a second method according to the disclosure.
FIG. 4 is a table further illustrating implementation of one method according to the disclosure.

FIG. 4 is a table illustrating these calculations for a player selecting the "equity" option. As shown, the expected value (EV) of the player's position is $11,730.00. In one embodiment, after the expected value (EV) of the player's position is determined, a discount factor ($D_f$) or penalty is applied to the expected value at step 316. For example, the penalty may be 5%, 10% or 15% depending upon the number of players remaining and the particular rules implemented by the tournament operator. For example, if the discount factor is 10%, an equity cash-out value (ECO) may be calculated as ECO=EV−(EV*0.10). Using the example of FIG. 4, the ECO would be calculated as $11,730−($11,730*0.10)=$10,557. The ECO is displayed to the player at step 318 along with a "settlement" button (FIG. 3, step 320) which gives the player the option of withdrawing from the tournament and cashing in his or her position for the equity cash-out value (ECO).

In one variation, the foregoing calculations may be performed at the beginning of the tournament or at different stages in a tournament and the results tabulated in a table similar to that shown in FIG. 4. In this variation, a number of assumptions may be made with regard to the number of remaining participants and the number of wagering units held by each participant in order to complete such a table. The table may then be used to estimate a participant's equity without the need to repeat the above described calculations for each participant at the conclusion of each game or hand. If a value, such as the number of wagering units held by each player, falls between the tabulated values, an estimate based upon interpolation between tabulated values may used. Such an estimate, based upon tabulated values may be used for providing a participant with an estimate of his or her equity. In the event that a player chooses to cash out, the above calculations will be performed to provide an equity value that may be used to cash the participant out of the tournament.

Turning again to FIG. 3A, If the player selects the ECO cash-out option at step 322, the player is settled or cashed in at step 330. In the example illustrated in FIG. 4, (10% discount factor) the player's account would be credited with $10,557.00 and the game operator is credited with a percentage of the penalty or discount at step 332 with the remainder credited to the tournament pot. In one embodiment, the game operator may be credited with 10% of the discount. In the example of FIG. 4, the discount is $1173.00; therefore, the game operator would receive $117.30. The remaining portion of the discount ($1055.70) would be credited to the tournament prize pot at step 334. After all participants have elected or declined the settlement option, the process ends at step 336 and tournament play resumes. The foregoing calculations allow for a participant to cash out without affecting the equity of the remaining players except to the extent that a penalty or part of any penalty assessed to a participant who withdraws while the tournament is in progress is added to the existing prize pool. In this case, the remaining respective equities of the remaining players are increased proportionately.

If a participant does not elect to settle after being informed of his or her equity at step 322, the participant's record or log will be checked at step 324 to determine whether the player selected the automatic cash out option. If the participant did not select the automatic cash out option, the process ends at step 326 and the tournament will continue after the remaining tournament participants either decline or elect to proceed with the settlement option. If the player did select the cash out option, the participant's equity will be compared to the stored automatic cash out amount previously selected by the player at step 328. If the participant's equity is determined to be greater than or equal to the participant's previously selected automatic cash out value, the participant is settled or cashed out at step 330.

FIG. 3B is a flow chart illustrating a method whereby a tournament participant selects an automatic cash out option. The automatic cash out option provides a player to set predetermined limits for his or her loss or gain in the tournament. If one of the predetermined limits is reached or exceeded the player may be automatically cashed out of the tournament. This feature allows a participant an opportunity to limit his or her losses by withdrawing from the tournament before he or she has lost more than a preselected amount. Alternatively the feature gives the participant an opportunity "get out ahead of the game" if his or her winnings reach a preselected value.

The process begins at step 350 when the participant elects to join the tournament. At step 352, an "automatic cash out" button 227 (FIG. 2) or similar indicia is displayed to participant, prompting the participant to select the automatic cash out option. If the participant elects the option at step 354, the player is prompted to select an equity value at step 358 at which the participant will be automatically cashed out of the tournament. In one variation, the player may select an upper and lower limit. For example, a player may decide that he or she will leave the tournament if his or her equity in the tournament drops to a lower cash out value or limit of $5,000 or increases to an upper cash out value or limit of $15,000.

If the participant fails to enter an automatic cash out value the process terminates at step 356 and the tournament game is initiated. Alternatively, if the participant enters an automatic cash out value or values, at step 362 the value or values are stored with the player record in database 204 (FIG. 2) for comparison with the participant's equity at selected intervals, for example, at the end of each hand (in the case of poker and similar card games) or at the end of each game played in the tournament.

In different embodiments, a participant may select an option that alerts the participant that he or she has reached preselected cash out limit rather than automatically cashing the player out of the tournament. For example, a player that pays a $10,000 entry fee may decide that he or she will leave the tournament if his or her equity in the tournament drops to $5,000 or increases to $15,000. In this variation, the player may enter the $5,000 and $15,000 values at step 360 and then chooses between an "alert" option and an "automatic cash out" option. If the participant selects the "alert" option, he or she will be notified when his or her equity drops to equal to or less than $5,000 or increases to a value equal to or greater than $15,000. The player may then choose to cash out of the tournament or continue to play. Alternatively, if the player selects the "automatic cash out" option, he or she will be automatically cashed out of the tournament if his or her equity drops to $5,000 or less or if his or her equity reaches a value equal to or greater than $15,000. If the participant wishes to continue to play after being cashed out, he or she will then have to re-enter the tournament.

In one adaptation, a tournament participant may be afforded the opportunity to receive a partial cash out of his or her equity or alternatively to increase his or her equity with additional funds. In the case where the casino style tournament game is poker, the participant may therefore increase the size of his or her chip stack by "purchasing" additional equity or alternatively, give up a portion of his or her chip stack in exchange for a partial cash out of his or her equity.

Neglecting any penalty or discount received by the game operator, the foregoing methods allow a participant to receive a settlement based upon his or her "equity," e.g., the expected value of his or her position in a tournament at a given point in time. The method may be utilized to allow a participant to settle or cash-out without affecting the expected value or "equity" of the positions held by the remaining participants in tournament. In the case where a portion of a penalty or discount is applied or credited to the tournament prize pot, the equity of the remaining participants may be increased.

Turning to FIG. 5, by way of further illustration, nine participants remain in a hypothetical poker tournament. The position, e.g. number of wagering units, of each of the remaining participants is presented, along with the percentage of the wagering units held by each of the nine remaining participants. In this example, the total number of "chips" or wagering units is assumed to be $219,625.00 and the prize pot is assumed to be approximately $29,033.00 with the payout table (prizes) for the remaining participants presented. As illustrated, the expected value of the leading participant is approximately $5514.00 while the expected value of the trailing participant is approximately $1971.00.

A chip index is also calculated as the percentage of chips or wagering units held by each participant divided by the percentage of the prize pots represented by the expected value of the participant's position. The index provides an indication of the relative expected value of each wagering unit held by a participant. Notably, the relative value of wagering units or chips held by a participant increases as the number of wagering units held by a participant decreases.

In another embodiment, a similar methodology may be used to determine a buy-in position for a participant or prospective participant desiring to enter an ongoing tournament. For example, if there are 10 participants remaining in a tournament having a prize pot of $100,000.00, a new participant may be required to "buy into" the tournament for a fee of $10,000.00. The expected value or equity of the new participant's position may then be estimated on the basis of a new prize pot of $110,000.00 with 11 participants and the game payout table as previously described. Although the buy-in fee or amount may be varied, it is anticipated that in most instances, the tournament rules will set a fixed a buy-in amount. It is also anticipated that the tournament rules will provide for an additional fee to be paid to the tournament operator or that the buy-in amount will be discounted to provide such a fee to the operator. For example, the tournament operator may charge a 5% or 10% fee for allowing a prospective participant to enter the tournament. The fee may be varied depending upon the amount of time remaining in the tournament or the number of participants remaining in the tournament at the time of the buy in.

The expected value or equity of the new participant's position may then be estimated on the basis of a new prize pot of $110,000.00 with 11 participants and the game payout table as previously described. The size of the chip stack or number of wagering units received by the new participant will then be determined on the basis of the expected value of his or her position at the time of the new participant's buy-in. The new participant's "buy in" does not impact the expected value of the position of the other participants in the tournament insofar as the participants' equity is determined based upon a larger prize pot to be divided by the participants.

In different variations, a participant may be allowed to purchase, e.g., add additional equity to his or her position during the course of a tournament. The expected value or equity of the participant's position may then be estimated on the basis of a new prize pot including the cost to the participant adding to his or her chip stack or wagering units. For example, if the prize pot is $100,000.00 and a participant elects to purchase additional chips or wagering units at a cost of $5000.00, the expected value or equity of the participants' positions may then be estimated on the basis of a new prize pot of $105,000.00 as previously described The foregoing method enables a tournament to continue indefinitely, subject to the rules of the tournament. Participants in a tournament may elect to "cash out" based on the expected value of their position relative to the other participants. Alternatively, prospective new participants may elect to "buy into" the tournament based upon the expected value of their position relative to the other participants. The foregoing method may be applied in tournaments wherein the tournament rules provide for multiple winners or where the rules provide for one winner or a "winner take all" payout.

It will be appreciated by those skilled in the art having the benefit of this disclosure that this method and apparatus for settlement and entry of a processor based tournament competition provides an equitable method for enabling a participant in a processor based gaming tournament to leave the tournament while still receiving a fair value for his position in the tournament considering his cash position, the number of participants in the tournament at the time and a predetermined payout table or scheme. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of providing a participant value in a game tournament wherein a plurality of participants play a casino-style game using player terminals linked via an electronic network to a central processing unit, the value provided to the participant based upon the participant's equity at the time the participant's equity reaches at least one preselected cash out value provided by the participant, the method comprising:

receiving, at least one equity cash out value and storing, with the central processing unit the at least one cash out value wherein the at least one cash out value is input by the participant using the player terminal;

estimating an equity for the participant in the tournament with the central processing unit, the central processing unit determining the equity based upon the number of wagering units held by the participant, the number of wagering units held by each other participant in the tournament and a payout table for the tournament;

comparing the participant's equity to the stored cash out value; and (i) if the tournament participant's equity has reached or exceeded the at least one cash out value, automatically withdrawing the participant from the tournament and providing the tournament participant with value proportional to the participant's equity; or (ii) if the tournament participant's equity has not reached the at least one cash out value, continuing tournament play.

2. The method of claim 1 wherein upper and lower cash out values are input by the tournament participant and wherein if the tournament participant's equity drops to a value equal to or less than the lower cash out value or increases to a value equal to or greater than the upper cash out value, the method further comprises automatically withdrawing the participant from the tournament and providing the tournament participant with value proportional to the participant's equity.

3. The method of claim 1 wherein the step of estimating an equity for the participant further comprises simulating, with the central processing unit, a tournament.

4. The method of claim 1 wherein the casino-style game is poker.

5. The method of claim 4 further comprising providing the tournament participant the participant's equity at the conclusion of each hand of poker.

6. The method of claim 4 wherein the step of estimating an equity for the participant comprises simulating multiple games with the central processing unit wherein a series of games are played to completion with participants being eliminated.

7. The method of claim 1 wherein the game tournament is conducted via a network wherein the tournament participants are electronically linked to a central processing unit including a game engine, the game engine generating game results for the participants.

8. A method of providing a participant value in a game tournament wherein a plurality of participants play a casino-style game using player terminals linked via an electronic network to a central processing unit, the value provided to the participant based upon the participant's equity at the time the participant's equity reaches at least one preselected cash out value provided by the participant, the method comprising:

receiving, at least one equity cash out value and storing, with the central processing unit the at least one cash out value wherein the at least one cash out value is input by the participant using the player terminal;

estimating an equity for the participant in the tournament with the central processing unit, the central processing unit determining the equity based upon the number of wagering units held by the participant and the number of wagering units held by each other participant in the tournament;

comparing the participant's equity to the stored cash out value; and (iii) if the tournament participant's equity has reached the at least one cash out value, notifying the participant that his or her equity has reached or exceeded the at least one preselected cash out value; or (iv) if the tournament participant's equity has not reached the at least one cash out value, continuing tournament play.

9. The method of claim 8 wherein upper and lower cash out values are input by the tournament participant and wherein if the tournament participant's equity drops to a value equal to or less than the lower cash out value or increases to a value equal to or greater than the upper cash out value, the method further comprises notifying the participant that his or her equity has reached or exceeded the at least one preselected cash out value.

10. The method of claim 8 wherein the casino-style game is poker.

11. The method of claim 10 wherein the step of estimating an equity for the participant in the tournament further comprises estimating a probability with the central processing unit for each participant that the participant will complete the tournament in a given place relative to the other participants in the tournament.

12. The method of claim 11 wherein the step of estimating a probability for each participant that the participant will complete the tournament in a given place relative to the other participants in the tournament further comprises simulating, with the central processing unit, a tournament.

13. The method of claim 12 wherein the tournament simulation is a Monte Carlo simulation.

14. The method of claim 11 wherein the step of estimating, with the central processing unit, a probability for each participant that the participant will complete the tournament in a given place relative to the other participants in the tournament comprises simulating with a machine-based simulation, multiple games wherein participants are eliminated.

15. The method of claim 8 wherein the game tournament is conducted via a network wherein the tournament participants are electronically linked to a central processing unit including a game engine, the game engine generating game results for the participants.

16. The method of claim 8 further comprising providing a potential participant the option to participate in the tournament for value proportional to the equity of the potential participant's position at the time the potential participant elects to enter the tournament.

17. The method of claim 16 wherein the value provided by the potential participant varies with the duration of the tournament.

18. A method of providing a game participant in a casino-style game tournament wherein participants participate in the tournament using player terminals linked via an electronic network to a central processing unit, value based upon the participant's equity in the tournament, the method comprising:

receiving, at least one equity cash out value and storing, with the central processing unit the at least one cash out value wherein the at least one cash out value is input by the participant using the player terminal;

determining the number of participants in the tournament;

determining the number of wagering units of each of the participants;

accessing, with a central processing unit, a pay-out table for the tournament, the payout table providing a pay-out ratio wherein a predetermined number of winners of the tournament receive a portion of a prize pot based upon their wagering unit position at the end of the tournament;

estimating an equity for the participant in the tournament with the central processing unit, the central processing unit determining the equity based upon the number of wagering units held by the participant and the number of wagering units held by each other participant in the tournament;

comparing the participant's equity to the stored cash out value; and (v) if the tournament participant's equity has reached or exceeded the at least one cash out value, automatically withdrawing the participant from the tournament and providing the tournament participant with value proportional to the participant's equity; or (vi) if the tournament participant's equity has not reached the at least one cash out value, continuing tournament play.

19. The method of claim 18 wherein the casino-style game is poker and wherein the steps of estimating an equity for the participant in the tournament with the central processing unit and comparing the participant's equity to the stored cash out value are done at the conclusion of each poker hand.

20. The method of claim 18 wherein upper and lower cash out values are input by the tournament participant and wherein if the tournament participant's equity drops to a value equal to or less than the lower cash out value or increases to a value equal to or greater than the upper cash out value, the method further comprises automatically withdrawing the participant from the tournament and providing the tournament participant with value proportional to the participant's equity.

* * * * *